United States Patent
Rojko (10) Patent No.: US 9,593,730 B2
(45) Date of Patent: Mar. 14, 2017

(54) SELF-RETENTION COMPRESSION SPRING WITH HOUSING

(71) Applicant: Siemens Aktiengesellschaft, Munich (DE)

(72) Inventor: Jan Rojko, Conyers, GA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 161 days.

(21) Appl. No.: 14/306,300

(22) Filed: Jun. 17, 2014

(65) Prior Publication Data

US 2015/0054208 A1 Feb. 26, 2015

Related U.S. Application Data

(60) Provisional application No. 61/868,106, filed on Aug. 21, 2013.

(30) Foreign Application Priority Data

Apr. 30, 2014 (EP) ..................................... 14166595

(51) Int. Cl.
| | |
|---|---|
| *F16F 1/06* | (2006.01) |
| *H01H 71/02* | (2006.01) |
| *F16F 1/366* | (2006.01) |
| *H01H 3/30* | (2006.01) |
| *F16F 1/12* | (2006.01) |

(52) U.S. Cl.
CPC ................ *F16F 1/06* (2013.01); *F16F 1/125* (2013.01); *F16F 1/3665* (2013.01); *H01H 3/3052* (2013.01); *H01H 71/0228* (2013.01)

(58) Field of Classification Search
CPC .... F16F 1/12; F16F 1/122; F16F 1/123; F16F 1/125

USPC .......................................................... 267/179
See application file for complete search history.

(56) References Cited

U.S. PATENT DOCUMENTS

| | | | |
|---|---|---|---|
| 4,682,138 A * | 7/1987 | Sell ...................... | H01H 73/303 337/66 |
| 2013/0127099 A1* | 5/2013 | Mimura .................. | C22C 38/02 267/166 |

FOREIGN PATENT DOCUMENTS

| | | | |
|---|---|---|---|
| JP | 06081870 A | * | 3/1994 |
| JP | 2001206640 A | * | 7/2001 |

OTHER PUBLICATIONS

Machine translation of JP 2001-206640 (no date).*
English-language abstract for JP 06081870 (Mar. 1994).*

* cited by examiner

*Primary Examiner* — Nicholas J Lane
(74) *Attorney, Agent, or Firm* — Harness, Dickey & Pierce, P.L.C.

(57) ABSTRACT

A compression spring is disclosed, which is configured to be used for various applications, and in particular for operate accessory linkages. Furthermore, a compression spring retention system is disclosed including a compression spring and a housing in which the compression spring is fixable. The compression spring includes a length of coiled wire having substantially a circular cross-sectional area, wherein at least a first end of the compression spring is formed as a retainer device that is configured to be compressed while being mounted into a recessed chamber of the housing and to expand when inserted into the recessed chamber in a way that the compression spring is fixed at the recessed chamber.

6 Claims, 6 Drawing Sheets

SELF-RETENTION COMPRESSION SPRING WITH HOUSING

PRIORITY STATEMENT

The present application hereby claims priority under 35 U.S.C. §119 to U.S. Provisional Patent Application No. 61/868,106 filed Aug. 21, 2013 and to European patent application number EP 14166595.0 filed Apr. 30, 2014, the entire contents of each of which are hereby incorporated herein by reference.

FIELD

At least one embodiment of the present invention is directed to compression springs which are used to various applications, and in particular for operate accessory linkages, wherein springs are fully secured at one end while the other end cannot be secured or wherein the other end of the spring would be cost prohibitive because such a design would require additional parts, mountings, or incur the added cost of tooling, and molds for over-molding.

BACKGROUND

In general, electrical circuit breakers are used to protect lives and personal property, and as such require that the design is safe and reliable. These circuit breakers are composed of various components and among those components are springs used for various compression and extension type applications.

For safe operation of these components, it is often crucial that the springs stay at an exact position at the component and, hence, reliably apply spring power at a desired spot. In case the spring changes its position or even completely drops off the component, malfunction of the component can be the result. Especially for security relevant components, such malfunction must he avoided. However, many spring designs do not utilize a device for keeping the springs in place, especially when circuit breakers are manufactured. In some cases, these springs have functionally failed when these springs have fallen from their contact areas. The dislodging of these springs has caused catastrophic failures.

To overcome the problem of dislodging springs, securing compression springs at both ends has been done at an added premium cost to the product. These added costs include but are not limited to the addition of extra parts, which would add to tooling costs, an increase in tooling costs as well as an increase in BOM and inventory. Moreover such designs added to the assembly costs of a product.

If the second end of the spring cannot be secured, the first end of the spring can be bonded or glued inside a guided seat. However, the trouble with such an alternative is the reliability of the bonding joint, which highly depends on the degreasing and cleaning mold release agent use during manufacture and assembly as well as the oxide on stored parts. In addition, the reliability and added costs of the product are affected by the selection of the proper bonder or primer, the added cost of a curing time for the epoxy, the application of the glue which can at times unreliably bond more than the 1st loop, and glue the 2nd or 3rd loop so as to impede the proper function of the spring—since it in effect reduces the number of active coils. All of the above would also apply to an insertion plastic molding process, where one end of the spring would be secured by being over-molded embedded with plastic in the mold.

SUMMARY

Therefore, to the inventors, it would be desirable that the linkages for a circuit breaker's internal accessories such as LCS (Leading Changeover Switch), TAS (Trip Alarm Switch), and other mechanisms, function properly and reliably. Since they are almost always operated by springs, it is desired that these springs are properly secured and do not fall within the circuit breaker during its assembly and/or during its normal operation.

Furthermore, it is desired, in at least one embodiment of the present invention, to secure the spring without negatively affecting the functioning of the spring as known from gluing processes and without increasing the number of necessary parts for fixing the spring. At least one embodiment of the invention attempts to solve, or at least improve upon, at least one of the above mentioned problems associated with the manufacture of compression springs where, due to physical constraints or added costs, the second end of a spring cannot be reliably held in place.

A compression spring is disclosed in at least one embodiment and a housing including a compression spring is disclosed in at least one embodiment. Further details of the invention unfold from the dependent claims as well as the description and the drawings.

A compression spring according to at least one embodiment of the invention comprises a length of coiled wire having substantially a circular cross-sectional area, wherein at least a first end of the compression spring is formed as a retainer device. The retainer device is configured for being compressed while being mounted into a recessed chamber and for expanding when inserted into the recessed chamber in a way to fix the compression spring in the recessed chamber. This compression spring has the advantage that it can he easily fixed to a housing without the need of extra parts or glue for fixation. Thereby, the retainer device functions like a snap-in mechanism and is, therefore, easy to install and provides for a reliable, releasable fixation of the compression spring to the housing.

BRIEF DESCRIPTION OF THE DRAWINGS

Further advantages, features and details of the invention unfold from the following description, in which by reference to drawings working examples of the present invention are described in detail. Thereby, the features from the claims as well as the features mentioned in the description can be essential for the invention as taken alone or in an arbitrary combination. In the drawings:

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, he embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should he understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A compression spring according to at least one embodiment of the invention comprises a length of coiled wire having substantially a circular cross-sectional area, wherein at least a first end of the compression spring is formed as a retainer device. The retainer device is configured for being compressed while being mounted into a recessed chamber and for expanding when inserted into the recessed chamber in a way to fix the compression spring in the recessed chamber. This compression spring has the advantage that it can he easily fixed to a housing without the need of extra parts or glue for fixation. Thereby, the retainer device functions like a snap-in mechanism and is, therefore, easy to install and provides for a reliable, releasable fixation of the compression spring to the housing.

In an advantageous first embodiment of the compression spring according to the invention, the retainer device is formed as a v-shaped locking hook and the compression spring is an LCS compression spring. Such locking hook has good snap-in properties, is easy to manufacture and easy to install at a respective recessed chamber of a housing.

Further preferred, the locking hook substantially extends parallel to a center axis of a coiled portion of the LCS compression spring. In this first embodiment, the compression spring can be installed in a housing in a mounting direction that is parallel to a center axis of a coiled portion of the compression spring until the locking hook snaps-in a recessed chamber of the housing.

Alternatively, in an advantageous second embodiment of the compression spring according to the invention, the retainer device is formed as a retainer loop and the compression spring is a TAS compression spring. In this second embodiment, a center axis of the retainer loop is substantially parallel to a center axis of a coiled portion of the TAS compression spring. The TAS compression spring can be installed into a housing in a mounting direction that is perpendicular to the center axis of the coiled portion of the TAS compression spring until the locking hook snaps-in a recessed chamber of the housing.

Advantageously, the compression spring is made from a flexible material having an elastic memory. Thus, the snap-in action of the retainer device and thereby a reliable and releasable fixation of the compression spring in a housing is ensured.

Moreover, the compression spring retention system according to at least one embodiment of the invention comprises a compression spring according to at least one embodiment of the invention and a spring housing having a recessed chamber with an opening for insertion of the retainer device of the compression spring there through. The housing is configured such that during mounting of the retainer device into the recessed chamber, the retainer device is compressed and expands when entering the recessed chamber, thereby fixing the compression spring to the housing.

Figure 4:
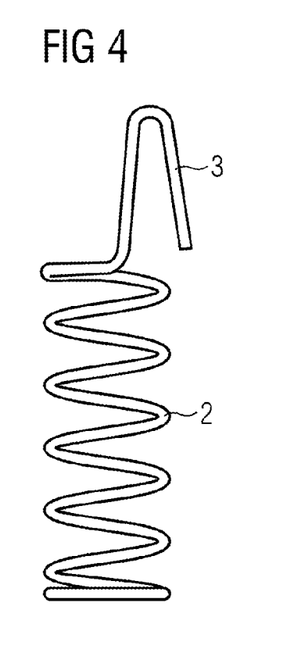
FIG. 4 shows a schematic side view of an LCS spring.
Figure 10:
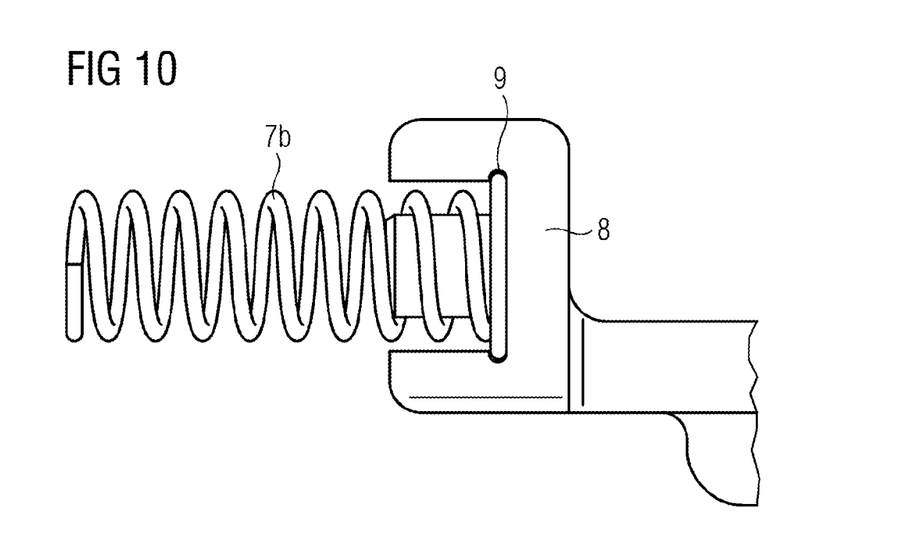
FIG. 10 shows a schematic side view of the TAS spring of FIG. 6 installed in a TAS actuation bar.
Figure 11:
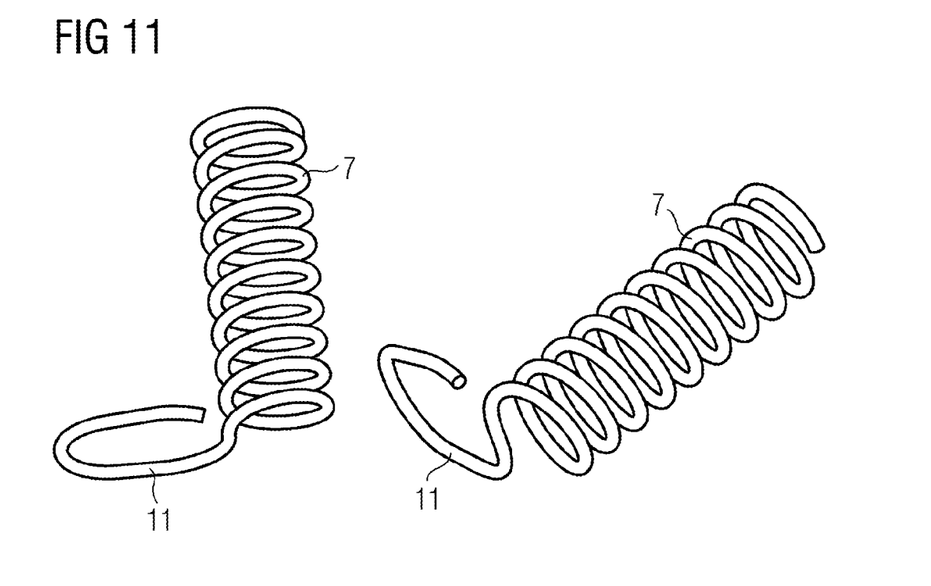
FIG. 11 shows a schematic perspective view of two TAS springs with retainer loops.

An embodiment of the present invention focuses on a compression spring wherein one end is secured within a housing of a circuit breaker. The compression spring comprises a helical design made of several coils that are compressed or expanded upon application. The compression spring generally includes a locking hook (3) or retainer loop to function as device for securing one end of the compression spring within a given space. Although several variations can be envisioned, an embodiment of the present invention includes the use of a locking hook 3 as best shown in (FIGS. 1, 2 and 4), and a retainer loop 11 in (FIG. 7 through FIG. 11) on one end of the classic compression spring. These unique added positioning and locking features, where the spring of one end is pulled into a pre-designed cavity (recessed chamber) 4a, 4b, 4c, or lust snapped into a groove 9 as shown in FIG. 10. The cost of these features at production quantities is minimal, and the added value is enormous. The benefits include an improved product reliability, as well as a minimization of unwanted reworks.

A robust design prevents the compression spring locking hook 3 or spring retainer loop 11 from falling out, no learning curve, untrained help can install or assemble them with ease. This new retainer feature of an embodiment of the present invention can be utilized in any electrical or electronic apparatus, or device linkages, and is not limited to only circuit breaker accessory linkages. This feature can be used whenever there is a need to surely capture or secure one end of a compression spring, while the other end lust presses on a flat face 10 of a wall.

Figure 5:
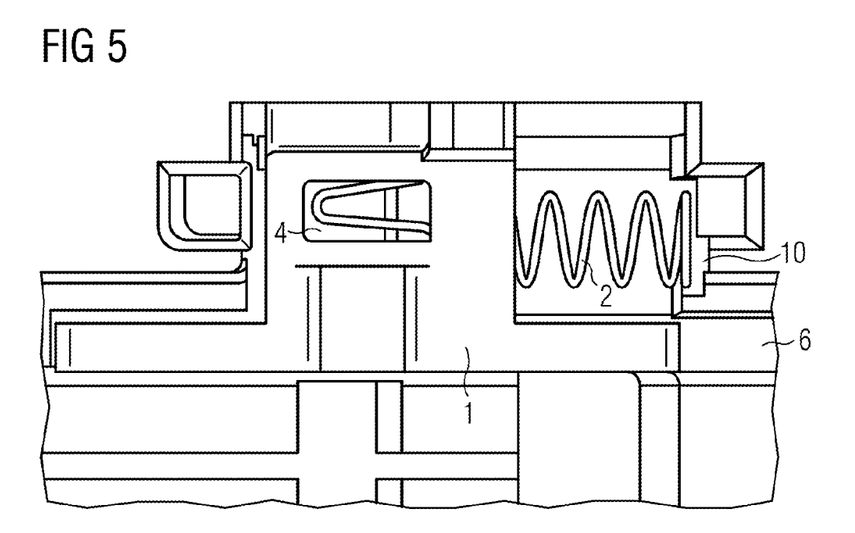
FIG. 5 shows a schematic side view of an LCS spring installed in a housing.
Figure 6:
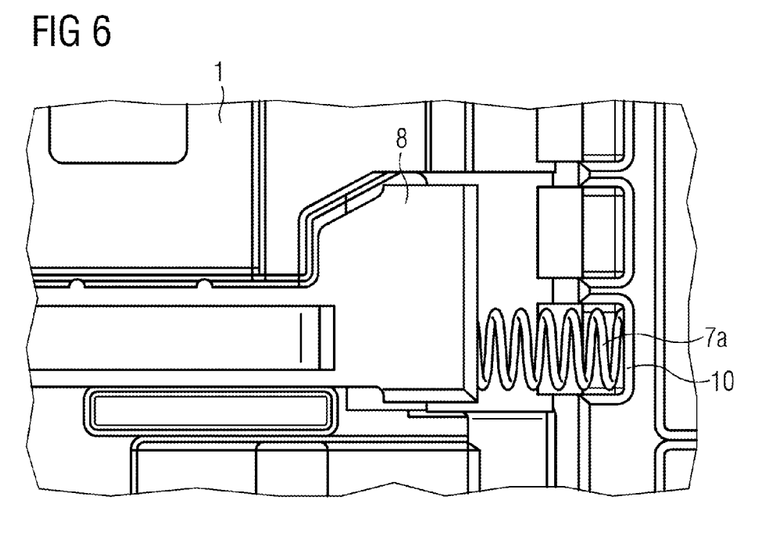
FIG. 6 shows a schematic side view of a TAS spring installed in a housing.
Figure 7:
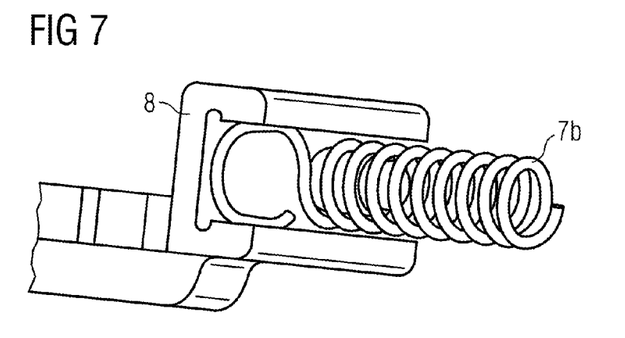
FIG. 7 shows a schematic perspective view of the TAS spring of FIG. 6 installed in a TAS actuation bar.

An embodiment of the present invention is described best in the representations shown in FIGS. 1-11. More specifically, the present invention in one embodiment may be described with reference and description of a coupling LCS (Leading Changeover Switch) with LCS compression spring 2 assembly (FIG. 1, 2, 5), where LCS compression spring 2 has a locking hook 3. In this embodiment the coupling LCS 1 or any other housing is equipped with a recessed chamber 4 as shown in FIG. 5, which accommodates the locking hook 3.

Figure 1:
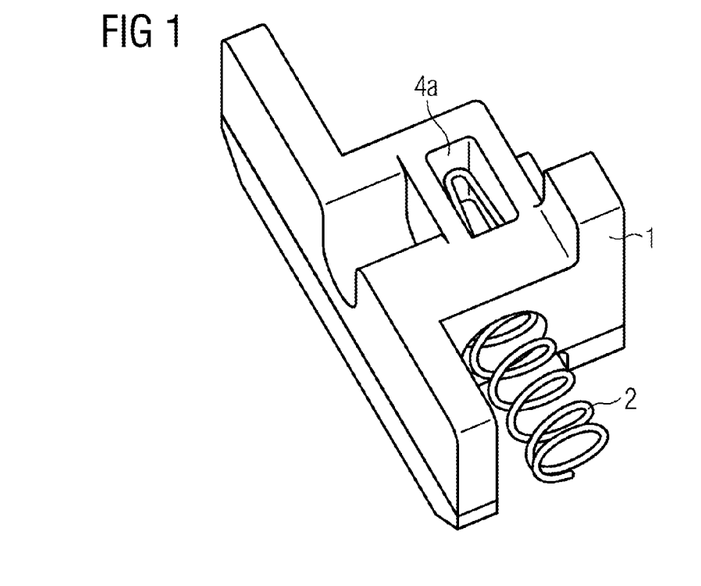
FIG. 1 shows a schematic perspective view of an LCS spring according to an embodiment of the invention that is installed to a coupling LCS.
Figure 2:
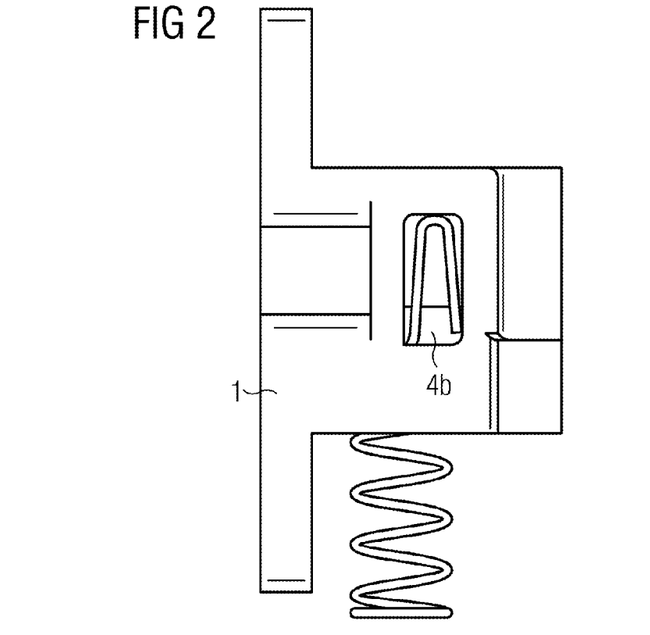
FIG. 2 shows a schematic side view of the LCS spring of FIG. 1 installed to a coupling LCS.
Figure 3:
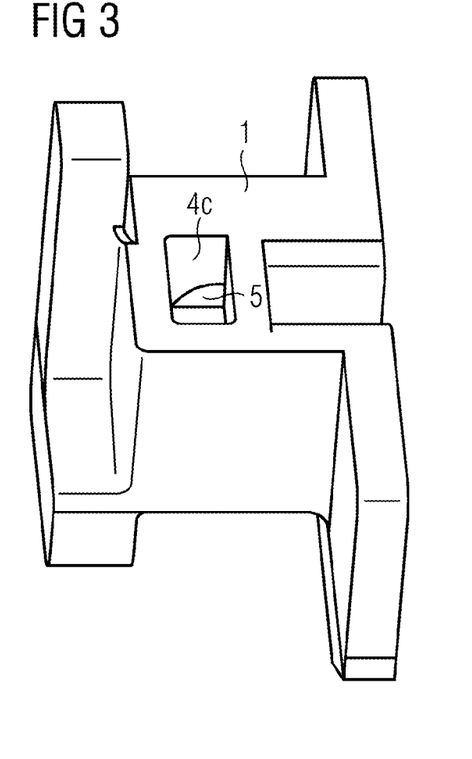
FIG. 3 shows a schematic perspective side view the coupling LCS for an LCS spring of FIG. 1 with no spring installed.
Figure 3A:
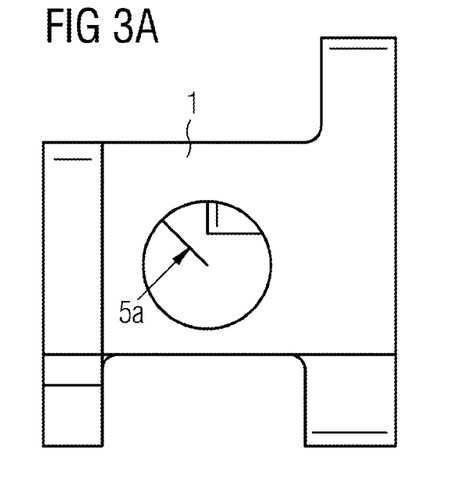
FIG. 3A shows a schematic front view of the coupling LCS of FIG. 3.

The installation of the LCS compression spring is as follows. The locking hook 3 is inserted through the spring guide 5a (FIG. 3A) half way into the quadrant Shaped through hole 5 in (FIG. 3). As soon as the one half of the locking hook appears inside the recessed chamber 4 (FIG. 5), using a small pointed tool such as small screwdriver or similar tool, the screwdriver/tool is used to pull the rest (the second half) of the locking hook 3 inside the recessed chamber 4 as far as the hook reaches the recessed chamber back wall 4a (FIG. 1). After the locking hook 3 is squeezed (the leg of the locking hook 3 or v-shaped compressible section) through a quadrant shaped through hole, the locking hook 3 springs open (the retention section expands) and secures the LCS compression spring 2 inside recessed chamber 4 in (FIG. 1, 2, 5).

The compression spring may be made from a variety of materials of a metal, reinforced plastic or any other material having the ability to compress and regain substantially its original shape. Normally, these compression springs are made of metal, from wires of specific gauges which are then coiled into a helical shape. The end windings in an embodiment of the instant invention (locking Hook 3 and retainer loop 11) are especially configured to connect with the space within the recessed chamber 4 or cavity so as to provide a friction fit, or resistance from side walls of the cavity or the walls in the recessed chamber. Moreover, the cavity used in the second embodiment below, comprises a groove used to retain the retainer loop in place within the cavity portion.

The compression spring maybe have a circular cross-sectional area, or an elliptical cross-sectional area, or any other cross sectional area capable of withstanding the stress and/or strain generated from the constant compression or release of the compression spring. In effect, the spring is contemplated to have the property of resisting deformation so as to rebound or retain substantially its shape. Although the spring is preferred to be made as a unitary structure, the spring may be made off several coils attached by various devices to different shaped end windings to perform various additional functions.

As previously mentioned, the spring can also be made from a flexible reinforced material which like the wired version would have deformation resistant properties, but also having (like the wire spring), an elastic memory so as to regain its shape after be back in its free form (no load condition).

Figure 8:
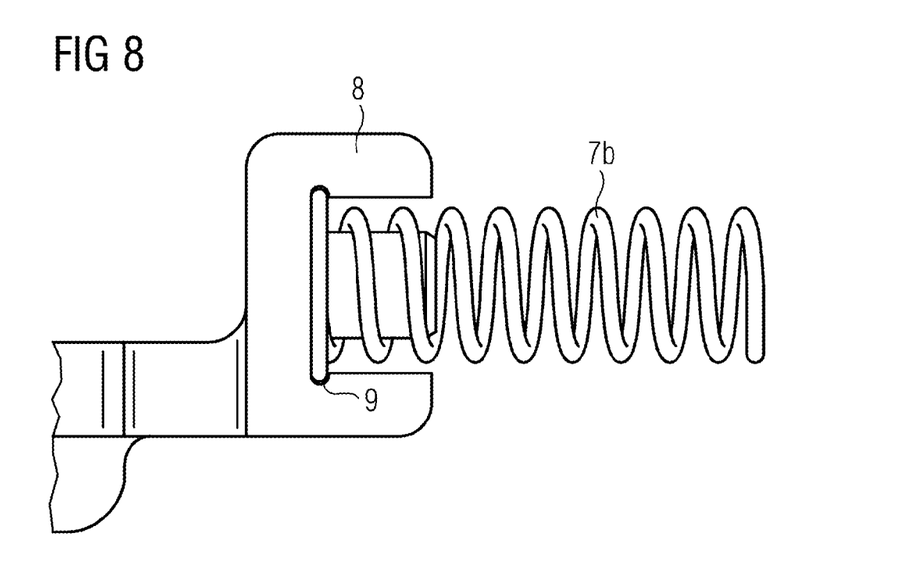
FIG. 8 shows a schematic side view of the TAS spring of FIG. 6 installed in a TAS actuation bar.
Figure 9:
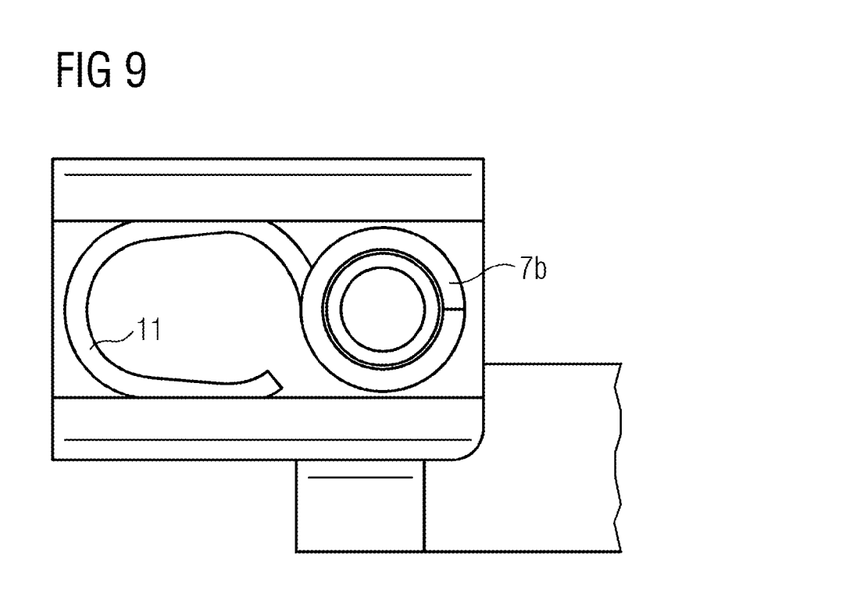
FIG. 9 shows a schematic front view of the TAS spring of FIG. 6 installed in a TAS actuation bar.

In another embodiment, the present invention maybe used with reference and description to a TAS actuation bar 8 with TAS compression spring 7, 7a, 7b assembly as best shown in FIG. 6-10. The TAS compression spring 7, 7a, 7b has a retainer loop 11 as shown in FIG. 7-11. The TAS actuation bar 8 or any other housing is equipped with a groove 9 (TAS actuation bar 8) which accommodates the spring's retainer loop 11 as shown in (FIG. 8, 10). In this embodiment the retainer loop 11 is inserted into the cavity of the TAS actuation bar 8 and since the retainer loop 11 and the remaining coils are substantially perpendicular (although any other angle will suffice), the active coils are mounted on a pole/mount so as to help secure the end of the TAS compression spring 7, 7a, 7b in place, prevent rotation of the TAS compression spring 7, 7a, 7b and direct the orientation of the coils.

To further help secure the spring in place, the groove 9 allows for portions of the retainer loop 11 to rest against the groove 9 walls. The retainer loop portion of the TAS compression spring 7, 7a, 7b exerts a force by its opposition to compression so as to secure the TAS compression spring 7, 7a, 7b more reliably.

The previous annotation of the compression spring describes an embodiment of the present invention by way of an example, only. However, the described example embodiment is not limiting the scope of the present invention to the features as illustrated in this example.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Although the invention has been illustrated and described in detail on the basis of the preferred example embodiment, the invention is not limited by the disclosed examples and other variations can be derived herefrom by the person skilled in the art, without departing from the scope of protection of the invention.

REFERENCE SIGNS

1 Coupling LCS
2 LCS compression spring
3 Locking hook
4 Recessed chamber
4a Recessed chamber back wall
4b Recessed chamber bottom
4c Recessed chamber front wall
5 Quadrant shaped through hole
5a Spring guide
6 Breaker upper housing
7 TAS compression spring
7a TAS compression spring (assembled with housing)
7b TAS compression spring (installed in TAS actuation bar)
8 TAS actuation bar
9 Groove (TAS actuation bar)
10 Flat face (LCS, TAS or any)
11 Retainer loop

What is claimed is:

1. A compression spring retention system, comprising:
   a length of coiled wire having a first end and a second end, at least the first end of the compression spring being formed as a retainer device; and
   a spring housing including a recessed chamber formed by a front wall, a back wall and side walls, wherein the spring housing has a first opening in the front wall for insertion of the retainer device of the compression spring therethrough, and a second opening orthogonal to the first opening formed in an exterior surface of the housing that opens onto the recessed chamber, wherein the spring housing is configured such that, during mounting of the retainer device into the recessed chamber, the retainer device is compressed and inserted through the first opening and is configured to expand when entering the recessed chamber, thereby fixing the compression spring to the housing.

2. The compression spring retention system of claim 1, wherein the compression spring is made from a flexible reinforced material including an elastic memory.

3. The compression spring retention system of claim 1, wherein the retainer device is formed as a v-shaped locking hook.

4. The compression spring retention system of claim 3, wherein the locking hook substantially extends parallel to a center axis of a coiled portion of the compression spring.

5. The compression spring retention system of claim 1, wherein the recessed chamber includes a spring guide extending into the chamber.

6. The compression spring retention system of claim 1, further comprising a circuit breaker housing, wherein the spring housing is retained in the circuit breaker housing and the second end of the compression spring is seated against a flat face of the circuit breaker housing.

* * * * *